United States Patent Office 2,959,521
Patented Nov. 8, 1960

2,959,521

PROCESS FOR PREPARING BETA-CAROTENE

James E. Zajic, Muscatine, Iowa, assignor to Grain Processing Corporation, Muscatine, Iowa, a corporation of Iowa No Drawing. Filed Jan. 12, 1959, Ser. No. 786,055

18 Claims. (Cl. 195—28)

This invention relates to a fermentation process and has for an object the provision of a process for producing beta-carotene by a fermentation method.

It is known that beta-carotene may be synthesized by certain microorganisms when cultivated in an aqueous nutrient medium. Microorganisms that have been found to be suitable for this purpose are species within the genus Choanephora (formerly Blakeslea). However, in the cultivation of a microorganism of the genus Choanephora, the yields of beta-carotene are not always what could be desired, and the art has been looking for means whereby the yields of beta-carotene can be substantially increased in fermentations of this general type. It is also known that in the cultivation of the Choanephora organisms the mycelium has a tendency to clump as the fermentation proceeds, thereby resulting in poor oxygen transfer to the mycelium in the interior of the clump. As a result when this clumping occurs, a corresponding reduction in the amount of beta-carotene synthesized is observed. The use of both surface-active agents and high viscosity media has been suggested to prevent clumping during the growth of organisms of this type. However, the surface-active agents are sometimes toxic to the growth of the organism and in certain instances the high viscosity medium presents problems in the subsequent handling of the fermentation mash after the fermentation has been completed.

Accordingly, one object of this invention is to provide a process for synthesizing beta-carotene in increased amounts.

A further object of this invention is to provide a process whereby beta-carotene production is stimulated when a nutrient medium is inoculated with a microorganism of the genus Choanephora.

Further and additional objects will appear from the following description and the appended claims.

In accordance with one embodiment of this invention, a process is provided for preparing beta-carotene which includes the step of cultivating a beta-carotene-producing strain of a microorganism of the genus Choanephora in a nutrient medium containing one or more organic antioxidants selected from the group consisting of 2,6-ditertiarybutyl - 4 - methylphenol, propenylmethylguaethol, alpha-tocopherol, N,N'-dibutyl-p-phenylenediamine, 6-ethoxy-1,2-dihydro - 2,2,4 - trimethylquinoline, ascorbic acid, hydroquinone, alpha-naphthol, lecithin, propylgallate, ascorbylpalmitate, ethylhydrocaffeate, 3,4-dihydrocoumarin, and thiodipropionic acid. In accordance with a further aspect of this invention, it has also been found that additional stimulation of beta-carotene formation is obtainable if an ionone and/or a terpenoid substance is added to the fermentation medium along with the antioxidant. The ionones that are particularly suitable for this purpose are those selected from the group consisting of beta-ionone, alpha-ionone, methylionone-alpha, methylionone-beta, methylionone-gamma, methylionone-delta and mixtures thereof. The terpenoid substances that are suitable for use are those disclosed in my copending application Serial No. 786,056, filed of even date herewith, and are selected from the group consisting of cedarwood oil, sprucewood oil, sandalwood oil, oil rose of geranium, cedarleaf oil, camphor, alpha-irone, cedrol, cedrenol, cedryl acetate, cedrenyl acetate and cedrone.

The nutrient medium to which the antioxidant and, if desired, the ionone and/or the terpenoid substance are added is of the conventional type known to be useful for the cultivation of the Choanephora microorganisms. Thus the aqueous medium ordinarily contains a source of carbohydrate, a nitrogen source such as a protein, a vegetable oil and usually a source of minerals, as is well known. In addition, vitamins and amino acids may be added if desired.

As will be apparent, any beta-carotene-producing strain of the genus Choanephora may be employed in accordance with this invention. The species that has been found to be particularly suitable, however, is Choanephora trispora. These organisms are aerobic in nature and, accordingly, the fermentation is carried out under aerobic conditions which may be provided by agitation or aeration of the medium during the incubation period.

For a more complete understanding of this invention, reference will now be made to one specific example of a process for carrying it out. However, it will be apparent that this invention is not limited to the specific details given in this example.

EXAMPLE

A basal aqueous fermentation medium is prepared containing 10% distillers' solubles solids, 1% starch, 3% soybean oil, 0.001% thiamine, .08% butylated hydroxytoluene (2,6-ditertiarybutyl - 4 - methylphenol), 0.1% cedarwood oil and 0.1% beta-ionone. This medium is sterilized in the usual manner and cooled to about 28° C. It has a pH of about 6.2. The inoculum is then prepared by cultivating Choanephora trispora on a dextrose-carboxymethyl cellulose-phytone medium and a 48-hour inoculum in the total amount of 8% is used to inoculate the basal fermentation medium. One-half of this 8% inoculum is Choanephora trispora NRRL 2456 and the other half is Choanephora trispora NRRL 2457. The inoculated medium is then incubated under aerobic conditions at 28° C. for six days. The beta-carotene produced is contained primarily in the mycelium and the amount of beta-carotene produced corresponds to about 465 milligrams for each liter of medium fermented.

After the fermentation, the mycelium is separated from the mash by standard centrifuging or filtration techniques and treated by conventional processes to stabilize the beta-carotene. The mycelium may be dried and sold directly as a feed grade beta-carotene product. If desired, crystalline beta-carotene may be prepared by well known procedures which involve extracting the mycelium with acetone, concentrating the extract in vacuo and saponifying the concentrated product with alcoholic potassium hydroxide. The beta-carotene present in the saponified concentrate is passed into petroleum ether and the acetone and saponified material removed by washing with water. Beta-carotene is easily crystallized by additional concentration of the petroleum ether extract.

With respect to the basic nutrient medium that may be used for cultivating species of Choanephora, it should ordinarily include the usual carbohydrate source, nitrogen source, vegetable oils, minerals and the like that are known to be necessary or desirable for achieving good growth and development of these microorganisms. Thus the medium should include a carbohydrate such as starch or starch-containing materials, such as milo, rye, red dog, cornstarch or the like. Also other carbohydrates, such as dextrin, glucose or other fermentable sugars, may be used. It is preferred that the amount of carbohydrate in the fermentation medium range between about ½ and 4 percent by weight. With respect to the nitrogen source, any proteinaceous material may be satisfactory for this purpose, such as distillers' solubles, acid hydrolyzed corn, cottonseed meal, soy flour, corn gluten meal and the like. The amount of proteinaceous material in the fermentation medium may be varied, but suitably it is within the range of from about 4 to 12 percent by weight.

It is known that vegetable oils are useful for promoting the growth of these organisms and, accordingly, it is preferred that venetable oils in the amount of from 0.5 to 4.5 percent by weight be included in the medium. Suitable vegetable oils are soy bean oil, corn oil, castor bean oil, rapeseed oil, sesame oil, rice oil, mustard seed oil, olive oil, linseed oil, peanut oil or other glycerides of vegetable origin.

The optimum and preferred pH for the medium is between about 5.5 and 7.5, while the preferred temperature of incubation is btween about 22° and 32° C. Ordinarily the fermentation will be complete and may be harvested in from 3 to 12 days. However, as indicated, six days is usually satisfactory.

It will also be appreciated that other growth-promoting substances or supplements may be added to the medium in addition to those specifically indicated above, such as minerals, vitamins, trace elements, amino acids and the like, and these supplemental additives include leucine, isoleucine, histidine, methionine, thiamine, ascorbic acid, di- or mono-basic potassium phosphate, ammonium carbonate, magnesium sulfate, etc.

With respect to the concentration of the antioxidants in the fermentation medium, they may be present in amounts of from 0.001 to 0.5 percent by weight. However, the concentration used should not be inhibitory to growth of the microorganism and may depend to some degree on the particular antioxidant that is employed and whether supplementary stimulants as herein described are used. If an ionone is employed as a supplementary stimulant, then suitable concentrations of the ionones in the fermentation medium are usually between 0.01 and 0.5 percent by weight. If a terpenoid substance is employed as a supplementary stimulant, then suitable concentrations of the terpenoid substances in the fermentation medium are usually between 0.005 and 1.2 percent by weight.

The antioxidant, the terpenoid substance and the ionone may be added to the basal medium at the time of inoculation with the microorganism or may be added some time after the fermentation has begun. They should, however, be added before the fermentation is essentially complete. If a six-day fermentation period is contemplated, it is generally preferred to add the stimulants to the fermenting medium before the end of the third day after inoculation.

In order to demonstrate the effectiveness of the various antioxidants as stimulants in the formation of beta-carotene as herein claimed, a series of experiments was carried out. In each of these experiments the basal fermentation medium contained 100 milliliters of 10% distillers' solubles solids to which were added 1% starch, 3% soybean oil and 0.001% thiamine. The basal medium in each instance was placed in 500 milliliter Erlenmeyer flasks and sterilized in an autoclave. After autoclaving the pH was about 6.2. An inoculum was prepared by growing Choanephora trispora for 48 hours on a dextrose-carboxymethyl cellulose-phytone medium of high viscosity and in each instance an 8% inoculum containing 4% of Choanephora trispora NRRL 2456 and 4% of Choanephora trispora NRRL 2457 was added to the fermentation medium. After inoculation the inoculated flasks were agitated at 200 r.p.m. on a conventional rotary shaker and the fermentation was permitted to continue for six days. After the fermentation was complete, the cellular or mycelial mass aws then homogenized and the excess moisture removed by suction filtration. An aliquot of the mycelium was removed, extracted with acetone and a quantitive determination of beta-carotene was completed by comparing the absorption at 450 millimicrons to that of a standard beta-carotene sample.

In a first experiment using the above technique, a series of sixteen fermentations was carried out in order to determine the effectiveness of certain of the herein claimed antioxidants in the nutrient medium for the stimulation of beta-carotene production. One flask contained no added antioxidant and is designated as the control, while the other fifteen flasks contained the indicated percentages of the several antioxidants. The stimulation due to the presence of the several antioxidants at the several concentrations is indicated in Table 1.

Table 1

STIMULATION OF BETA-CAROTENE SYNTHESIS WITH VARIOUS ANTIOXIDANTS

| Antioxidant, percent | Mg. Beta-carotene/100 ml. Fermentation Medium |
|---|---|
| 2,6-Ditertiarybutyl-4-methylphenol, .1% | 27.8 |
| Propenylmethylguaethol, .04% | 25.4 |
| Alpha-tocopherol, .002% | 23.7 |
| N,N'-dibutyl-p-phenylenediamine, .05% | 22.3 |
| 6-ethoxy-1,2-dihydro-2,2,4-trimethylquinoline, .1% | 22.1 |
| Ascorbic acid, .1% | 21.6 |
| Hydroquinone, .05% | 20.9 |
| Alpha-naphthol, .01% | 17.6 |
| Lecithin (vegetable), .1% | 16.0 |
| Propylgallate, .04% | 14.8 |
| Ascorbylpalmitate, .04% | 11.3 |
| Ethylhydrocaffeate, .06% | 10.0 |
| 3,4-Dihydrocoumarin, .09% | 9.8 |
| Thiodipropionic acid, .16% | 9.1 |
| Control (no antioxidant) | 5.8 |

Thus Table 1 shows that the herein claimed antioxidants stimulate the production of beta-carotene when present in the nutrient medium and compared against the control which contained no antioxidant additive.

As previously indicated, certain ionones when added to the medium together with the antioxidant will provide additional stimulation of beta-carotene production. In order to demonstrate this, a further experiment was carried out in which flasks were prepared containing the basal medium (control), basal medium plus beta-ionone, and a combination of beta-ionone and several antioxidants in several different concentrations. In this instance the antioxidants were added prior to inoculation and the beta-ionone was added to the fermentation 48 hours after inoculation. The results are indicated in Table 2.

Table 2

INCREASED STIMULATION OF BETA-CAROTENE SYNTHESIS OBTAINED WITH MIXTURES OF SELECTED ANTIOXIDANTS AND BETA-IONONE

| Antioxidant—Beta-ionone treatments | Mg. Beta-carotene/100 ml. Fermentation Medium |
|---|---|
| .10% 2,6-Ditertiarybutyl-4-methylphenol+.10% beta-ionone | 32.1 |
| .03% Propenylmethylguaethol+.10% beta-ionone | 28.9 |
| .09% N,N'-dibutyl-p-phenylenediamine+.10% beta-ionone | 27.5 |
| .10% Ascorbic acid+.10% beta-ionone | 25.4 |
| .002% Alpha tocopherol+.10% beta-ionone | 21.3 |
| Control (no treatment) | 3.4 |
| Control+.1% beta-ionone | 12.9 |

From the experiment reported in Table 2 it is noted that beta-ionone gives some stimulation but that the stimulation is greatly enhanced when a combination of the antioxidant and beta-ionone is added to the fermentation medium. As suggested above, alpha-ionone and the methyl ionones, alpha, beta, gamma and delta, may be used to replace wholly or in part the beta-ionone to obtain this additional stimulation.

In order to demonstrate that optimum results are obtained when an antioxidant is used in combination with an ionone and a terpenoid substance, a further experiment was carried out in which eight flasks were prepared and treated as indicated in Table 3 and inoculated. The antioxidants were added prior to inoculation. The cedarwood oil was added to the fermentation after 24 hours and the beta-ionone after 48 hours.

Table 3

STIMULATION OF BETA-CAROTENE SYNTHESIS WITH MIXTURES OF ANTIOXIDANTS, CEDARWOOD OIL, AND BETA-IONONE

| Treatment | Mg. Beta-carotene/100 ml. Fermentation Medium |
|---|---|
| .08% 2,6-Ditertiarybutyl-4-methylphenol | 11.7 |
| .08% 2,6-Ditertiarybutyl-4-methylphenol +.3% cedarwood oil | 24.8 |
| .08% 2,6-Ditertiarybutyl-4-methylphenol +.1% cedarwood oil +.1% beta-ionone | 46.5 |
| .08% Propenylmethylguaethol | 17.2 |
| .08% Propenylmethylguaethol +.3% cedarwood oil | 28.9 |
| .06% Propenylmethylguaethol +.1% cedarwood oil +.1% beta-ionone | 32.2 |
| Control (no treatment) | 5.7 |
| .10% beta-ionone | 25.1 |

It will be noted that the percent of antioxidant and cedarwood oil needed to obtain maximum stimulation when used in conjunction with beta-ionone is decreased over the levels of antioxidant and cedarwood oil needed to get maximum stimulation when added separately. While cedarwood oil is the specific terpenoid substance shown in Table 3, it will be apparent, as above noted, that the cedarwood oil, when used, may be wholly or partially replaced by the other terpenoid substances disclosed in my copending application Serial No. 786,056.

In view of the foregoing, it has been shown that the several antioxidants herein claimed are very effective for increasing the yields of beta-carotene in a fermentation process, utilizing an organism of the genus Choanephora. Additional stimulation is also achieved if one of the ionones and/or a terpenoid substance are added in addition to the antioxidant.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process for preparing beta-carotene which includes the step of cultivating a beta-carotene-producing strain of a microorganism of the genus Choanephora in a nutrient medium containing an antioxidant selected from the group consisting of 2,6-ditertiarybutyl-4-methylphenol, propenylmethylguaethol, alpha-tocopherol, N,N'-dibutyl-p-phenylenediamine, 6-ethoxy-1,2-dihydro-2,2,4-trimethylquinoline, ascorbic acid, hydroquinone, alpha-naphthol, lecithin, propylgallate, ascorbylpalmitate, ethylhydrocaffeate, 3,4-dihydrocoumarin, and thiodipropionic acid.

2. The process recited in claim 1 wherein the cultivating step is carried out under aerobic conditions and wherein the microorganism is Choanephora trispora.

3. The process recited in claim 1 wherein said medium also contains an ionone selected from the group consisting of beta-ionone, alpha-ionone, methylionone-alpha, methylionone-beta, methylionone-gamma, methylionone-delta and mixtures thereof.

4. The process recited in claim 1 wherein said medium also contains a terpenoid substance selected from the group consisting of cedarwood oil, sprucewood oil, sandal wood oil, oil rose of geranium, cedarleaf oil, camphor, alpha-irone, cedrol, cedrenol, cedryl acetate, cedrenyl acetate and cedrone.

5. A process for preparing beta-carotene which includes the step of cultivating under aerobic conditions a beta-carotene-producing strain of a microorganism of the genus Choanephora in an aqueous nutrient medium containing between about 0.001 and 0.5 percent by weight of an antioxidant selected from the group consisting of 2,6-ditertiarybutyl-4-methylphenol, propenylmethylguaethol, alpha-tocopherol, N,N'-dibutyl-p-phenylenediamine, 6-ethoxy-1,2-dihydro-2,2,4-trimethylquinoline, ascorbic acid, hydroquinone, alpha-naphthol, lecithin, propylgallate, ascorbylpalmitate, ethylhydrocaffeate, 3,4-dihydrocoumarin, and thiodipropionic acid.

6. The process recited in claim 5 wherein said medium also contains between about 0.01 and 0.5 percent by weight of an ionone selected from the group consisting of beta-ionone, alpha-ionone, methylionone-alpha, methylionone-beta, methylionone-gamma, methylionone-delta and mixtures thereof.

7. The process recited in claim 5 wherein said medium also contains between about .005 and 1.2 percent by weight of a terpenoid substance selected from the group consisting of cedarwood oil, sprucewood oil, sandalwood oil, oil rose of geranium, cedarleaf oil, camphor, alpha-irone, cedrol, cedrenol, cedryl acetate, cedenyl acetate and cedrone.

8. The process of claim 5 wherein the microorganism is Choanephora trispora.

9. A process for preparing beta-carotene which includes the step of cultivating a beta-carotene-producing strain of a microorganism of the genus Choanephora in a nutrient medium containing a fermentable carbohydrate, a protein, a vegetable oil and an antioxidant selected from the group consisting of 2,6-ditertiarybutyl-4-methylphenol, propenylmethylguaethol, alpha-tocopherol, N,N'-dibutyl-p-phenylenediamine, 6-ethoxy-1,2-dihydro-2,2,4-trimethylquinoline, ascorbic acid, hydroquinone, alpha-naphthol, lecithin, propylgallate, ascorbylpalmitate, ethylhydrocaffeate, 3,4-dihydrocoumarin, and thiodipropionic acid.

10. A process for preparing beta-carotene which includes the step of cultivating under aerobic conditions a beta-carotene-producing strain of a microorganism of the genus Choanephora in an aqueous nutrient medium containing between about ½ and 4 percent by weight of a fermentable carbohydrate, between about 4 and 12 percent by weight of a proteinaceous material, between about ½ and 4½ percent by weight of a vegetable oil, and between about 0.001 and 0.5 percent by weight of an antioxidant selected from the group consisting of 2,6-ditertiarybutyl-4-methylphenol, propenylmethylguaethol, alpha-tocopherol, N,N'-dibutyl-p-phenylenediamine, 6-ethoxy-1,2-dihydro-2,2,4-trimethylquinoline, ascorbic acid, hydroquinone, alpha-naphthol, lecithin, propylgallate, ascorbylpalmitate, ethylhydrocaffeate, 3,4-dihydrocoumarin, and thiodipropionic acid.

11. The process recited in claim 10 wherein said medium also contains between about 0.01 and 0.5 percent by weight of an ionone selected from the group consisting of beta-ionone, alpha-ionone, methylionone-alpha, methylionone-beta, methylionone-gamma, methylionone-delta and mixtures thereof and between about 0.005 and 1.2 percent by weight of a terpenoid substance selected from the group consisting of cedarwood oil, sprucewood oil, sandalwood oil, oil rose of geranium, cedarleaf oil, camphor, alpha-irone, cedrol, cedrenol, cedryl acetate, cedrenyl acetate and cedrone.

12. A process for preparing beta-carotene which includes the step of cultivating under aerobic condition a beta-carotene-producing strain of Choanephora trispora in an aqueous nutrient medium containing 2,6-ditertiarybutyl-4-methylphenol.

13. A process for preparing beta-carotene which includes the step of cultivating under aerobic conditions a beta-carotene-producing strain of Choanephora trispora in an aqueous nutrient medium containing propenylmethylguaethol.

14. A process for preparing beta-carotene which includes the step of cultivating under aerobic conditions a beta-carotene-producing strain of *Choanephora trispora* in an aqueous nutrient medium containing alpha-tocopherol.

15. A process for preparing beta-carotene which includes the step of cultivating under aerobic conditions a beta-carotene-producing strain of *Choanephora trispora* in an aqueous nutrient medium containing N,N'-dibutyl-p-phenylenediamine.

16. A process for preparing beta-carotene which includes the step of cultivating under aerobic conditions a beta-carotene-producing strain of *Choanephora trispora* in an aqueous nutrient medium containing 6-ethoxy-1,2-dihydro-2,2,4-trimethylquinoline.

17. A process for preparing beta-carotene which includes the step of cultivating under aerobic conditions a beta-carotene-producing strain of *Choanephora trispora* in an aqueous nutrient medium containing between about ½ and 4 percent by weight of a fermentable carbohydrate, between about 4 and 12 percent by weight of a proteinaceous material, between about ½ and 4½ percent by weight of a vegetable oil, between about 0.005 and 1.2 percent by weight of cedarwood oil, and between about 0.001 and 0.5 percent by weight of an antioxidant selected from the group consisting of 2,6-ditertiarybutyl-4-methylphenol, propenylmethylguaethol, alpha-tocopherol, N,N'-dibutyl-p-phenylenediamine, 6-ethoxy-1,2-dihydro-2,2,4-trimethylquinoline, ascorbic acid, hydroquinone, alpha-naphthol, lecithin, propylgallate, ascorbylpalmitate, ethylhydrocaffeate, 3,4-dihydrocoumarin, and thiodipropionic acid.

18. A process for preparing beta-carotene which includes the step of cultivating under aerobic conditions a beta-carotene-producing strain of *Choanephora trispora* in an aqueous nutrient medium containing between about ½ and 4 percent by weight of a fermentable carbohydrate, between about 4 and 12 percent by weight of a proteinaceous material, between about ½ and 4½ percent by weight of a vegetable oil, between about 0.005 and 1.2 percent by weight of cedarwood oil, between about 0.01 and 0.5 percent by weight of beta-ionone, and between about 0.001 and 0.5 percent by weight of 2,6-ditertiarybutyl-4-methylphenol.

References Cited in the file of this patent

UNITED STATES PATENTS 2,865,814    Hesseltine et al. -------- Dec. 23, 1958

FOREIGN PATENTS 679,087    Great Britain ---------- Sept. 10, 1952

OTHER REFERENCES

Bessey: Morphology and Taxonomy of Fungi, The Blakiston Co., 1950, Phila., pages 155, 167–8 and 185.

Annual Review of Biochemistry (1952), vol. 21, pages 487–490.

Annual Review of Biochemistry (1953), vol. 22, page 531.

Annual Review of Biochemistry (1955), vol. 24, pages 510–515.

Barnett et al.: Science, vol. 123, No. 3187, January 27, 1956, page 141.

Annual Review of Biochemistry (1958), vol 27, page 372.